Figure 4:
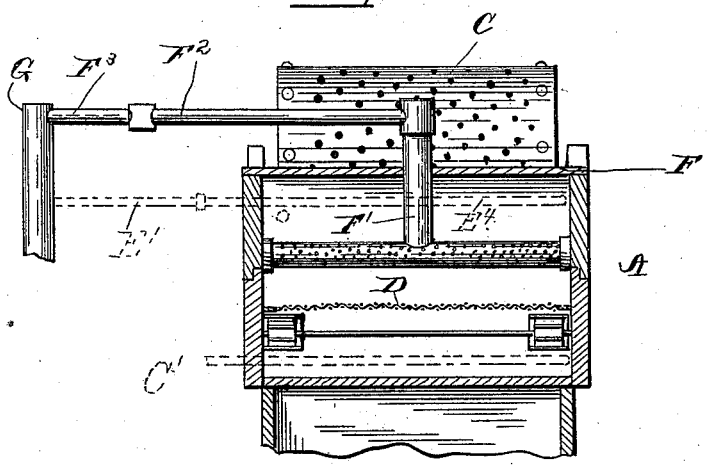

(No Model.) 2 Sheets—Sheet 1.
D. F. STAUFFER.
BRETZEL AND CRACKER MANUFACTURING APPARATUS.
No. 366,041. Patented July 5, 1887.
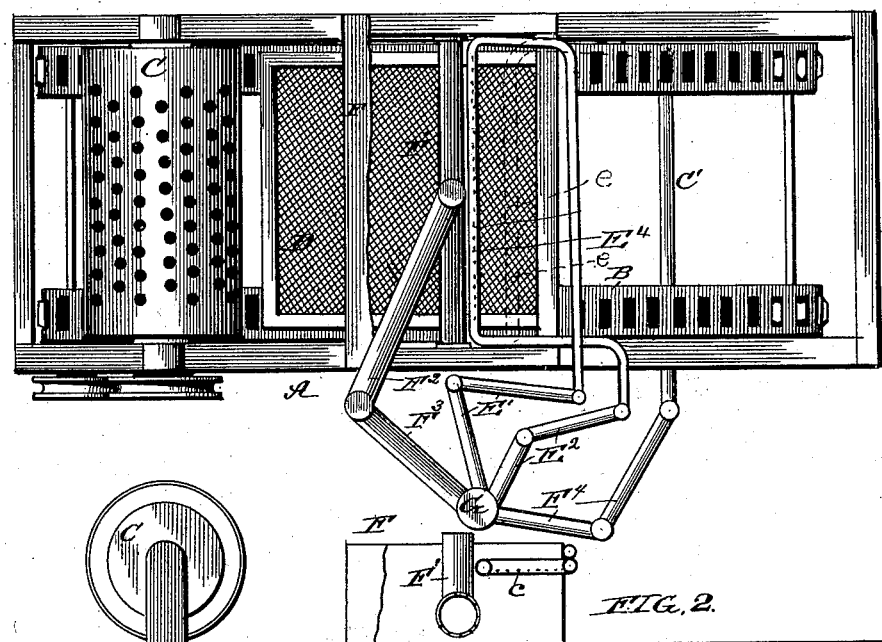
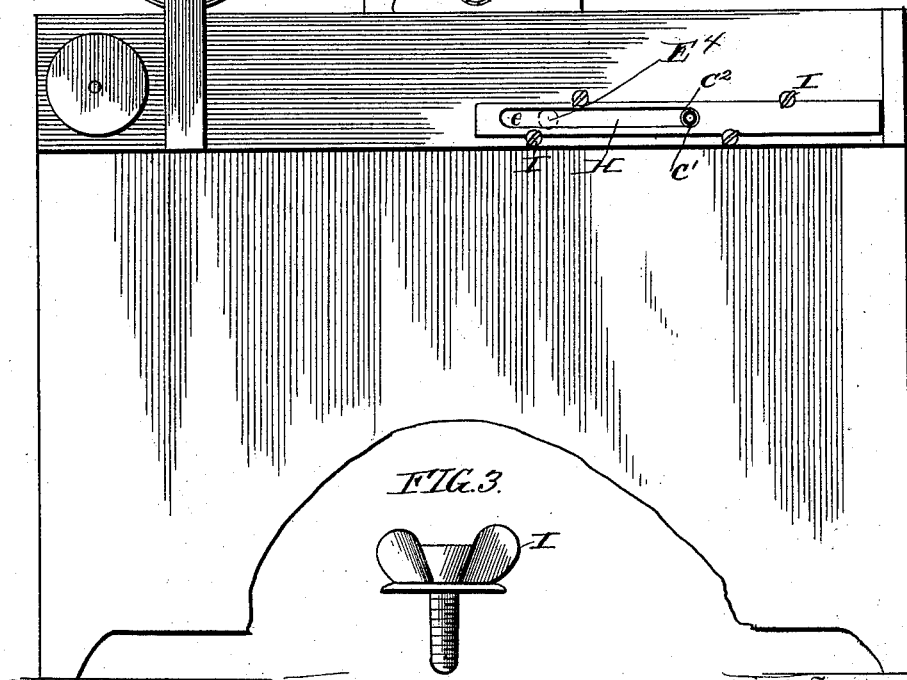
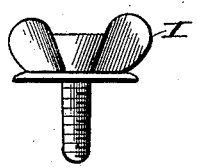

(No Model.) 2 Sheets—Sheet 2.

D. F. STAUFFER.
BRETZEL AND CRACKER MANUFACTURING APPARATUS.

No. 366,041. Patented July 5, 1887.

Witnesses
Ira R. Steward,
Charles J. Stockman,

Inventor
David F. Stauffer
By His Attorney
Chas. A. Barbur

UNITED STATES PATENT OFFICE.

DAVID F. STAUFFER, OF YORK, PENNSYLVANIA.

BRETZEL AND CRACKER MANUFACTURING APPARATUS.

SPECIFICATION forming part of Letters Patent No. 366,041, dated July 5, 1887.

Application filed January 6, 1887. Serial No. 223,590. (No model.)

*To all whom it may concern:*

Be it known that I, DAVID F. STAUFFER, a citizen of the United States, residing at York, in the county of York and State of Pennsylvania, have invented certain new and useful Improvements in Apparatus for Treating Bretzels and Crackers in the Process of Manufacture, of which the following is so full, clear, and exact a description as will enable others skilled in the art to which my invention appertains to make and use the same, reference being had to the accompanying drawings, in which—

Figure 1 is a top plan view of my improved apparatus. Fig. 2 is a side view of the same. Fig. 3 is a detail view of the locking device for the plate which covers the slot in the side of the frame or bed piece. Fig. 4 is a cross-section of my improved apparatus, showing the position of the two spraying-pipes with respect to each other.

This invention relates to apparatus for treating bretzels and crackers after the dough has been made; and it consists in a novel means of imparting to the bretzel or cracker a glossy surface, which I accomplish in the manner hereinafter fully set forth, and particularly pointed out in the claims at the end of the specification.

The object of my invention is to provide an apparatus which will effectually give the bretzel or cracker a high polish or brightened surface, and I accomplish this by the novel arrangement and construction of parts, hereinafter fully explained.

In the drawings, A designates the main table or bench, upon which is mounted an endless carrier, B, which in turn is mounted upon suitable shafts carrying pulleys or wheels provided with suitable sprockets, which engage with recesses in the belt. At one end of the table I provide a perforated cylinder for salt, C, which is adapted to be rotated above the endless carrier and to sprinkle salt on the bretzels as they are passed through beneath it on a carrier.

As a means of conveying the bretzels and crackers across the endless carrier I use a perforated pan, D. This pan is usually made of galvanized iron; but one might be used which was made of tin or wire without departing from the spirit of my invention.

In my Letters Patent No. 345,186, which were granted July 6, 1886, I have shown and described a complete apparatus for preparing and heating a brine or liquor which I use for the purpose of giving the bretzels or crackers the required polish or finish; but that apparatus is found defective in the following parts: First, the diffusion of steam over the top of the bretzels, as was accomplished by the device shown in that patent, I found to be inadequate to the requirements of the case. I have also found by various experiments that an additional brightened surface can be imparted to the goods by giving them a spray of the liquor after they have become partially baked and in the oven.

The general characteristics, then, of this invention are based upon the apparatus shown in the patent referred to; and the improvement consists in the following material points: First, I provide, in addition to the spraying-pipe shown in that patent, an additional spraying-pipe in the top of the chest, which contains the T-shaped perforated pipe shown in my patent, which I letter in this instance $c$. This furnishes additional steam in the top of the chest or steam-box, keeping it hotter and making it less liable to condense in the top of the box. I also provide a pipe, $E^t$, which is perforated at $e\ e\ e$, and which extends along beneath the endless carrier, and the steam from which passes up through the bretzels and crackers from beneath, as is clearly shown in Fig. 1. Thus it will be seen that the bretzels and crackers not only become steamed and moistened from the top, as in my former invention, but they also become steamed and moistened from the under side at the same time, which gives us a much better article and one which is more evenly cured throughout.

By reference to Fig. 1 it will be observed that the steam chest or box F is provided in its top with a T-shaped pipe, F', as was shown in my former patent. The T-pipe F' is supplied with steam from a pipe, $F^2$, and this pipe gets its steam from a third pipe, $F^3$, which is joined to the main pipe G. The pipe E is supplied with steam at both ends, one coming from the pipes E' E', and it also coming through another pipe, E² E². The pipe C' in the lower portion of the bed of the table over which runs the endless carrier is also provided with steam, which enters the pipe through the pipes F⁴ F⁴. It will be observed that all three of these pipes are supplied from the main pipe G, which pipe is supplied with heated liquid or vapor which has arrived at a certain predetermined degree of temperature, and which is allowed to flow from the boiler through the large pipe, and into the several pipes hereinbefore described, in a vapor or steam to meet the requirements. Each of the pipes, it will be observed, which are perforated, and which are designed to sprinkle steam or spray over the bretzels and crackers, is provided with a pipe which passes from the main pipe G to the perforated pipe in two sections, each one of which is jointed midway between the perforated pipe and the main pipe G. The purpose of these jointed pipes is to facilitate the adjustment of the steam box or chest at any desired point along the top of the table or bed-frame. The object of this adjustment is to allow the operator to have the bretzels at a greater or less distance from the perforated salt-cylinder when they are steamed and sprinkled, the reason being as follows: If it is desired to have a large quantity of salt adhere to the bretzels or crackers, the steam box or chest is moved close up to the perforated salt-cylinder, and the salt is sprinkled over the bretzels when they are in a very moist condition, whereas if it is desired to make bretzels and crackers with less salt on their surface the box or chest is moved at a greater distance from the salt-cylinder, thus giving the bretzels and crackers considerable time to dry or to partially dry before they reach that point where they are sprinkled with salt.

In the side of the bed-piece of the table or frame I provide a slot, H, which slot is to facilitate the sliding back and forth of the pipe C'. This pipe is provided with a plate, which fits snugly around it at C². This plate is adapted to slide along with the pipe C', and to close up the opening in the slot on either side of the pipe C' when it has been adjusted to the desired position. If there is a tendency on the part of the plate to work loose and allow the steam to escape, the plates are provided with suitable set-screws or locking devices, I I, a detail of which is shown in Fig. 3. The side piece of the bed-frame, which is provided with a slot, should also be provided with suitable bushings for the set-screws or locking devices I. I do not wish to be understood as limiting myself to this exact construction of device for holding the plate in place on the side of the bed-frame, as any other equivalent might be used without departing from the spirit of my invention. It is also, of course, understood that I do not wish to be understood as limiting myself to the use of the jointed pipes leading from the main to the sprinkling-pipes, as it is quite apparent that the pipes might be made in a single piece and pipes of whatever lengths be used to adjust it to the different positions on the table; and I might use either of these ways of doing without departing from the spirit of my invention. My main object in using the jointed pipes is to save the trouble of readjusting and removing the pipes every time I change the position of the chest or box.

I do not wish to be understood as claiming, broadly, the sprinkling of bretzels and crackers both from above and below at the same time; but What I believe to be new and desire to secure by Letters Patent, and what I therefore claim, is—

1. In an apparatus for treating bretzels and crackers during the process of manufacture, the combination of a sliding sprinkling device mounted above the bretzels and a second sprinkling device arranged beneath the bretzels, to operate on the bretzels from top and bottom, substantially as and for the purposes specified.

2. The combination, with the main frame or table, the endless carrier, and the perforated pan, of the sliding steam chest or box provided with a perforated pipe in its central lower portion, and the second perforated pipe or sprinkler in its upper portion, all constructed and combined to operate substantially as and for the purposes specified.

3. The combination, with the main frame, the endless carrier, and the pan for carrying the bretzels or crackers, of the box or steam-chest containing the sprinkler in its lower portion and the second sprinkler in its upper portion, and the third sprinkling device, which is arranged beneath the pan as it passes through the machine for steaming and moistening the bretzels from both top and bottom, substantially as and for the purposes specified.

4. In a bretzel and cracker machine of the character described, the combination of the main steam box or chest with suitable sprinkling-pipes having jointed connections between the main pipe and the sprinkling-pipes, to facilitate the adjustment of the box or steam-chest at any point along the bed-piece or top of the table, substantially as and for the purposes specified.

5. In a bretzel and cracker machine of the character described, the combination, with the main table provided with suitable carriers and steaming apparatus, of the slotted side piece to permit of the sliding pipe C' in the bottom of the bed-piece, substantially as and for the purposes described.

6. In a bretzel and cracker machine of the character described, the slotted side piece provided with a plate which fits over and is adapted to be adjusted with the sliding pipe C', having suitable locking devices for fastening the plate snugly up against the side piece of the table when it is adjusted to the desired position, in combination with suitable sprinkling devices and carriers, all constructed and combined to operate substantially as described.

In testimony that I claim the above as my invention I hereunto set my hand in the presence of two subscribing witnesses.

DAVID F. STAUFFER.

Witnesses:
W. L. BOYDEN,
L. M. PAXTON.